A. UGSTAD.
WINDMILL REGULATOR.
APPLICATION FILED JULY 22, 1912.

1,062,621.

Patented May 27, 1913.

Witnesses
Jos. J. Kosler.
E. J. Thobaben

Inventor
Alfred Ugstad
By
Fred E. Dillman
Attorney

COLUMBIA PLANOGRAPH CO., WASHINGTON, D. C.

UNITED STATES PATENT OFFICE.

ALFRED UGSTAD, OF CARLISLE TOWNSHIP, OTTERTAIL COUNTY, MINNESOTA.

WINDMILL-REGULATOR.

1,062,621.   Specification of Letters Patent.   Patented May 27, 1913.

Application filed July 22, 1912. Serial No. 710,828.

*To all whom it may concern:*

Be it known that I, ALFRED UGSTAD, a citizen of the United States, residing in Carlisle township, in the county of Ottertail and State of Minnesota, have invented certain new and useful Improvements in Windmill-Regulators, of which the following is a specification.

My invention relates to improvements in wind mill regulators, the primary object being to provide a generally improved regulator for wind mills of exceedingly simple, cheap, and efficient construction, having means whereby the speed of the mill may be readily regulated to meet the varying demands of actual service.

The improved regulating device may be found useful for use in connection with wind mills of different forms and types, the present embodiment being particularly adapted for use in connection with wind mills of the vane-governor type which work out of the wind, or in other words, which are automatically locked or brought out of operation when a certain predetermined velocity of the wind is reached.

With the above mentioned and other ends in view, the invention consists in the novel construction, arrangement, and combination of parts, hereinafter described, illustrated in one of its embodiments in the accompanying drawings, and particularly pointed out in the appended claim.

Figure 1:
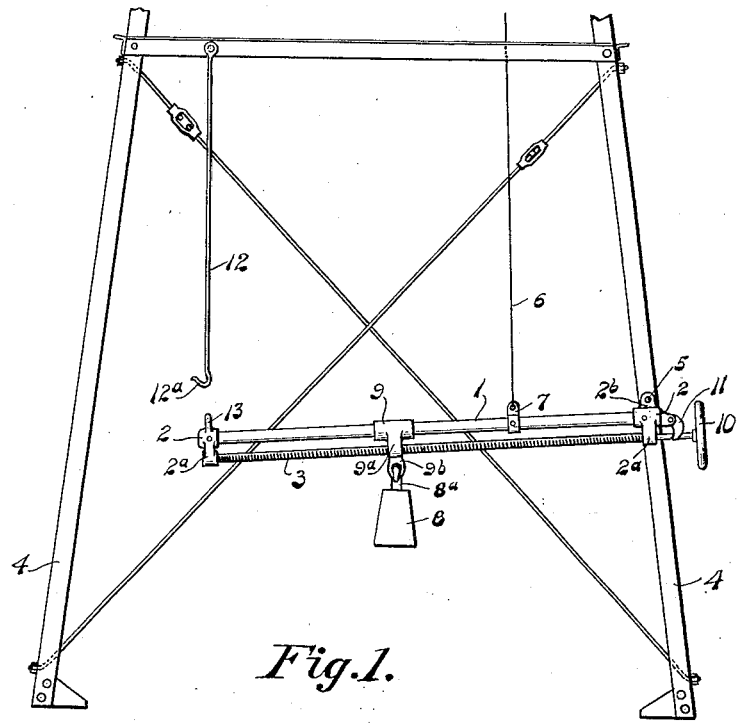
Figure 2:
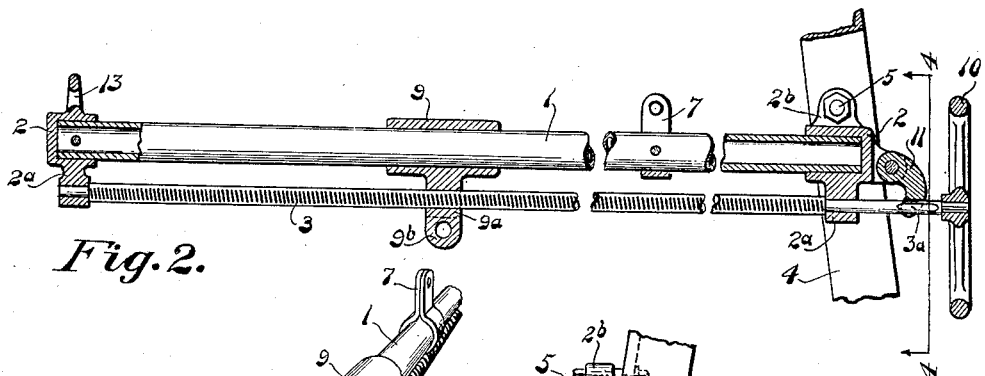
Figure 3:
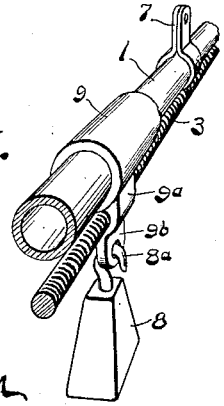
Figure 4:
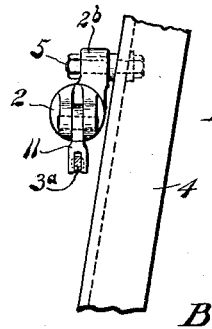

Referring to the drawings, forming a part of this specification, Figure 1, is a side elevation of the improved device in its operative position applied to the base portion of a wind mill tower. Fig. 2, an enlarged detail view, partly in longitudinal section, for the purpose of clearer illustration of the parts. Fig. 3, a perspective view of the same. Fig. 4, an end view taken on line 4—4 of Fig. 2.

Similar numerals of reference designate like parts throughout all the figures of the drawings.

The improved regulator comprises a poised regulating lever comprising a pivotally mounted guide bar 1, provided at opposite ends with head members 2, the latter having depending bearing portions $2^a$, carrying a longitudinally extending threaded regulating shaft 3. The head member 2, at the base of the regulating shaft is provided with a bearing lug $2^b$, for pivotally attaching the regulating lever to one of the tower beams or members 4, as for example,—by means of a pivot bolt and nut 5. The poised regulating lever is adapted to be attached to the pull rod or wire 6, leading to the mill mechanism above by means of an attaching clip 7, secured to the guide bar 1.

As a means for weighting the regulating lever as well as regulating or adjusting the tension of the lever upon the pull wire 6, for the purpose of regulating the speed of the mill, a weight 8, is slidably and adjustably mounted upon the guide bar 1, by means of a sleeve or slide 9, the latter being provided with a lug portion $9^a$, having a threaded opening to receive and contain the threaded regulating shaft 3, said lug portion terminating in an eye $9^b$, for the reception of a hook member $8^a$, of the weight 8, and as a means for shifting the sleeve 9, together with the attaching weight 8, longitudinally of the guide bar or regulating lever, the regulating shaft 3, is provided with a hand wheel 10, whereby the screw shaft 3, may be rotated as desired, it being obvious that when the poised regulating bar is in its operative position as illustrated in Fig. 1, of the drawings that if a high speed is desired the weight 8, and sleeve or slide 9, should be shifted toward the outer or free end of the regulating lever, thus increasing the leverage upon the pull wire 6, thus correspondingly increasing the resistance to the mill regulating mechanism above before the free end of the lever will be raised, and on the other hand, if a slower speed is desired, the regulating shaft 3, will be rotated in a reverse direction to carry the slide 9, and weight 8, toward the base or pivoted portion of the regulating lever thus increasing the sensitiveness of the lever in an obvious manner.

As a means for locking the threaded regulating shaft 3, in adjusted position, a bifurcated latch member 11, is pivotally mounted between lugs of the base head member 2, and above the shaft 3, the free end of said latch member 11, being adapted to take over or straddle a flattened portion $3^a$, of the regulating shaft whereby to prevent the accidental rotation of the latter.

When it is desired to manually throw the mill out of operation, the free end of the poised regulating lever may be elevated and engaged and held in its elevated position by means of a hook 12ª, of a swinging bar 12, said hook 12ª, being hooked into an eye 13, of the end head member 2.

From the foregoing description, taken in connection with the accompanying drawings, the operation and advantages of my invention will be readily understood.

Having thus described one of the embodiments of my invention, what I claim and desire to secure by Letters Patent is,—

A regulating lever for wind mills, comprising a guide bar provided with head members at its opposite ends, a threaded shaft rotatably mounted in said head members and provided at one end with a hand wheel, a weighted slide mounted on said guide bar and engaged by said threaded shaft, and bifurcated latch member for locking said threaded shaft in adjusted position.

In testimony whereof I have affixed my signature in presence of two witnesses.

ALFRED UGSTAD.

Witnesses:
 N. T. MOER,
 CONRAD BAGLO.

---

Copies of this patent may be obtained for five cents each, by addressing the "Commissioner of Patents, Washington, D. C."